United States Patent Office 3,423,659
Patented Jan. 21, 1969

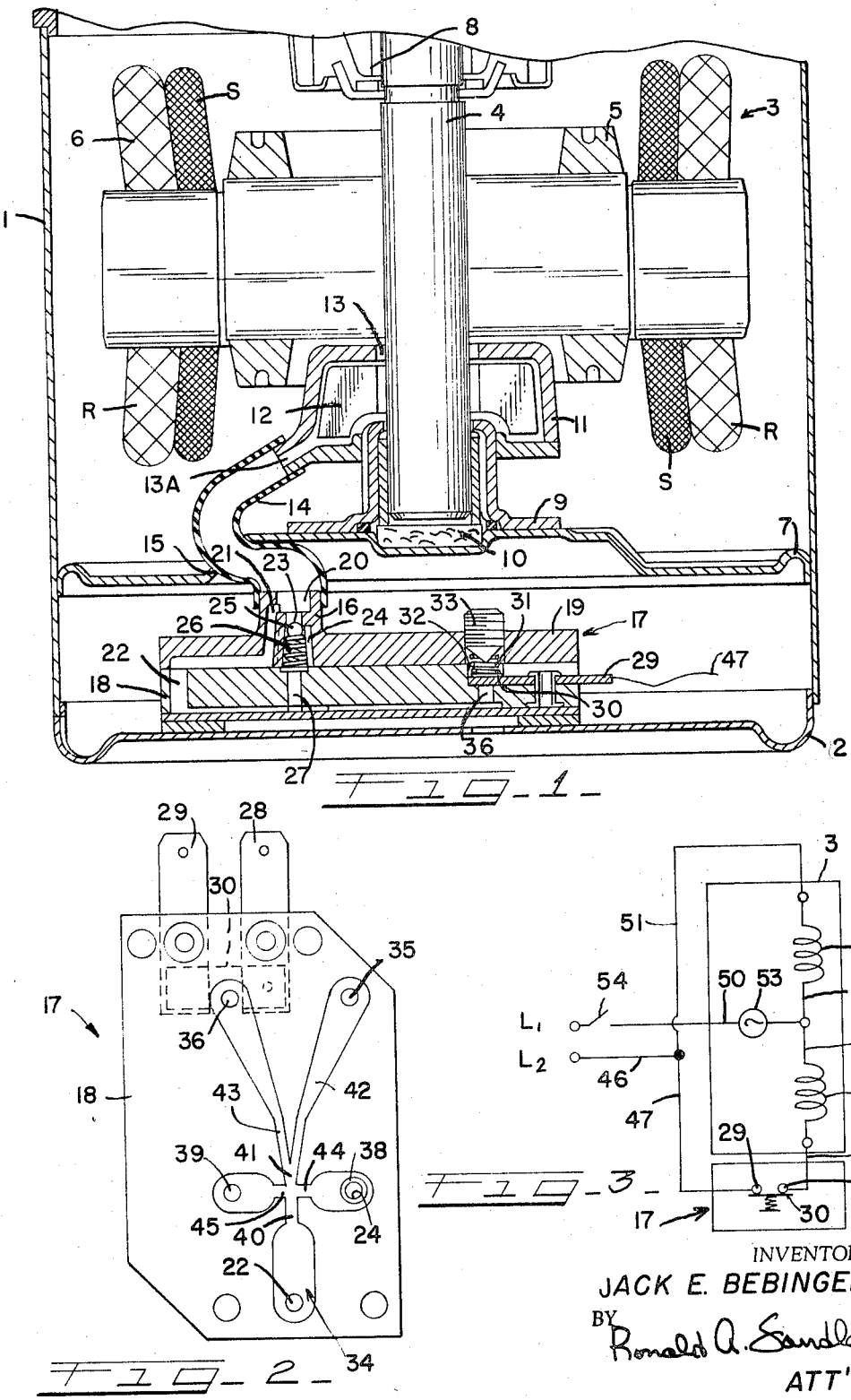

3,423,659
MOTOR WINDING CONTROL EMBODYING A FLUID AMPLIFIER
Jack E. Bebinger, Brookfield, Wis., assignor to General Electric Company, a corporation of New York
Filed July 13, 1966, Ser. No. 564,786
U.S. Cl. 318—221      4 Claims
Int. Cl. H02p 1/44, 3/18

ABSTRACT OF THE DISCLOSURE

Improved control means for use with a single phase induction motor having a main winding, a start winding and a motor shaft. Basically, the improved control means comprises normally-closed contact means openable at a preselected pressure to de-energize the start winding in response to a stream of pressurized fluid that is developed by compression means and delivered to the contact means through fluid amplifier means. The compression means is adapted to be operatively associated with the motor such that the stream pressure is proportional to the speed of the motor and is fluid connected to the contact means through the fluid amplifier means in such a manner that the stream is not delivered to the contact means unless it is at or above the preselected pressure.

---

This invention relates to electric motor control systems, and more particularly, to means for controlling the energization circuit of the start winding of a single phase induction motor by means responsive to the speed of the motor.

Single phase induction motors generally include a main or operating winding therein, and an auxiliary or start winding. Conventionally, the start winding must be energized, and subsequently deenergized when the motor achieves a predetermined percentage of its normal operation speed. Such motors have been provided with various types of controls so that the start winding of the motor is de-energized at a desired proportional speed of the motor, which will then bring itself up to the full rated speed by the main winding of the motor. Among the means responsive to the speed of the motor shaft for de-energizing the start winding circuit are included fluid responsive devices which act directly on the start winding contacts.

In a number of fluid responsive devices known to applicant, a pressure build-up is required before separation of the contacts that remove the start winding from the circuit occurs. More specifically, as a required pressure must be built up to overcome the biasing force that maintains the contacts in a conducting relationship, the separation of the contacts is not instantaneous but actually occurs over a short period of time. While this is mechanically satisfactory, it is well known that a slow separation of contacts increases the amount of arcing therebetween. Where there is an increase in arcing, it is necessary to provide contacts of a superior quality, which thereby increases the cost of the motor. Alternatively, while switches of the snap-action type that accommodate a pressure build-up are available, they are relatively costly in comparison to the simple pressure actuated switch.

It is, therefore, an obect of my invention to provide an electric motor winding control including an improved fluid control means that is instantaneously responsive to a desired motor speed.

A further object of my invention is to provide a motor winding control means wherein the motor is of the conventional single phase induction type having a main winding and a start winding, and wherein the energization and de-energization of the start winding is controlled by a fluid control means that is responsive to the speed of the motor.

It is a further object of my invention to provide a motor winding control means which advantageously employs a fluid amplifier to achieve an essentially instantaneous application of pressure on the start winding contacts.

Briefly stated, in accordance with one aspect of the present invention, I have provided control means for a single phase induction motor having a main winding, a start winding, and a motor shaft. The control means includes pressure actuated contact means for controlling energization of the start winding. Fluid compression means are disposed in operative association with the motor shaft, and provide a stream of fluid at pressures proportional to the speed of the motor. A first outlet passage is disposed downstream of the fluid compression means and is adapted to exhaust the fluid stream to atmosphere. A second outlet passage is also disposed downstream of the fluid compression means and is adapted to direct the fluid stream against the pressure actuated contact means, to thereby control energization of the start winding.

A control port is disposed upstream of the first and second outlet passages, and is effective upon passage of fluid therethrough to direct the fluid stream substantially exclusively into the second outlet passage. Means responsive to a preselected pressure of the fluid stream are provided to admit fluid to the control port and thereby cause the fluid stream to flow into the second outlet passage, whereby energization of the start winding is dependent upon the speed of operation of the motor.

Other features and advantages of my invention will be apparent from the following detailed description of a presently preferred embodiment thereof, read in connection with the accompanying drawing, in which:

FIGURE 1 is a side elevational view in partial cross section of an electric motor embodying my improved motor winding control means;

FIGURE 2 is a bottom plan view of the fluid amplifier and connecting passages comprising part of the present invention; and FIGURE 3 is a schematic representation of a control circuit for the motor of FIGURE 1.

Referring first to FIGURE 1, there is shown a motor casing 1 having at its bottom an enclosure or support plate 2. Disposed within casing1 is a small fractional horsepower induction motor, indicated generally by numeral 3. Motor 3 has a rotor shaft 4 extending therethrough. An armature 5 is carried by the shaft 4, and disposed about armature 5 is a stator 6 which includes start and run windings, S and R respectively, as is conventional.

A bottom bearing plate 7 is rigidly positioned within casing 1 and supports shaft 4 for rotary movement. An upper bearing 8 is provided to maintain the shaft in proper alignment. Disposed about the bottom of shaft 4 and on bearing plate 7 is a bearing cup assembly 9, which includes an oil wick 10 disposed therein.

Rigidly secured about the upper portion of the bearing cup 9, and surrounding shaft 4, is a fan or compressor casing 11. A plurality of fan or pump blades 12 are rigidly secured to shaft 4 within the area defined by the compressor casing 11. The blades 12 rotate within compressor casing 11 as the shaft 4 rotates during operation of the motor. The blades effect an increased compression of air within the casing as the motor approaches operational speed.

The top of the compressor casing is spaced from shaft 4 to provide an annular pasage 13, through which air may enter the casing. One side of the compressor casing is formed to provide a suitable outlet passage 13A through which a stream of compressed air may exit from the casing. Extending from outlet passage 13A is a flexible conduit 14 which passes through an opening 15 in bearing plate 7. Conduit 14 is rigidly secured at its opposite end to an inlet fitting 16, which forms part of the fluid amplifier indicated generally by numeral 17. The fluid amplifier 17 is disposed within the compartment defined by the bottom support plate 2 and the lower bearing plate 7, and is rigidly mounted on the bottom support plate 2. The particular structure for providing the pressurized air flow to the amplifier forms part of a copending application by John McClure, entitled "Motor Winding Control Means," Ser. No. 564,977, filed of even date herewith and assigned to my present assignee.

Referring once again to FIGURE 1, it will be observed that fluid amplifier 17 includes a control plate 18 and a cover plate 19 thereover. Cover plate 19 includes the aforementioned inlet fitting 16 on the top surface thereof. The inlet fitting 16 has an opening 20 provided therein that is in communication with conduit 14. A first passage 21 extends from the opening 20 of the inlet fitting, through the cover plate 19, and into an inlet conduit 22 for control plate 18. A second passage 23 extends from the opening of inlet fitting 16 to a chamber 24 disposed therebelow. Disposed within chamber 24 is a ball valve 25 and compression spring 26. Spring 26 normally biases ball valve 25 upwardly, closing passage 23, and thus prevents air from entering chamber 24. A passage 27 extends from the bottom of chamber 24 to the control surface of the amplifier, for reasons hereafter explained.

At the opposite end of the fluid amplifier there is disposed a set of horizontally spaced electrical terminals 28 and 29. Positioned above terminals 28 and 29 is a bridging contact plate 30. A compression spring 31 is located within a passage 32 in the cover plate 19, and is positioned above contact plate 30. Spring 31 maintains plate 30 in closed circuit relation with terminals 28 and 29, and thereby provides a continuous electrical path through the amplifier. A conical set screw 33 is positioned in the top of passage 32 to provide calibrating adjustment for spring 31.

Referring now to FIGURE 2, wherein the configuration of the fluid amplifier is best illustrated, it will be seen that the control plate 18 includes an inlet or power chamber 34 which is disposed immediately below the passage 22. The amplifier 17 further includes a first outlet port 35 and a second outlet port 36. The first outlet port 35 comprises a passage through the amplifier that communicates with atmosphere, while the second outlet port 36 (FIGURE 1) extends through the base 18 of the amplifier to a point midway between the ends of contact plate 30. A first control port 38 is in communication with passageway 27. A second control port 39 is in communication with atmosphere by way of a passage (not shown) extending from opening 39 on the control surface 18 and through the cover plate 19.

Fluid ampifiers, of the type illustrated in FIGURE 2, which is the type utilizing a side control jet to deflect a main fluid stream into one of several branch passages, are well known. In this type of device, a main stream passageway is connected to a chamber from which branch passageways lead off. At the point where the main stream enters the chamber, side ports for passage of control fluid transverse to the main stream are provided which, by selectively allowing such control fluid to flow, will control the main stream by deflecting it into the desired branch passage. These devices are therefore referred to as fluid amplifiers due to the fact that a small control fluid flow may be utilized to control the flow of a large fluid stream. Naturally, an advantage of such control device is the fact that the momentum of the primary flow stream is preserved, and any pressure drop across the device is quite small. In addition, such devices may be made to be bistable, that is, once the primary stream is deflected to flow through a branch stream, the boundary layer effect between the stream and the flow passage walls tend to lock the primary stream to flow in this direction. When pressure from one of the control ports is applied, the reaction of the main stream in switching from one outlet channel to the other is virtually instantaneous. The amplifier may also be designed so that it is only upon predetermined pressure flow from the control port that the main flow will switch from one outlet branch to the other.

Referring again to FIGURE 1, conduit 22, as discussed above, communicates by way of passage 21 with opening 20 of inlet fitting 16. When motor 3 starts to rotate, the fan blades 12 disposed within compressor casing 11 will channel air through outlet 13. The air flows through conduit 14, inlet 20, and passages 21 and 22 under substantial pressure and mass flow. The air then flows from passage 22 to inlet chamber 34 on the control plate. A main stream of air egresses from inlet chamber 34 through a passage 40 and into a second chamber 41. From chamber 41, the air may exit through passageway 42 and then out through the first outlet 35, or it may exit through passageway 43 and then out through the second outlet port 36.

As is well known in the fluid amplifier art, control inlets 38 and 39 communicate with chamber 41 by means of passageways 44 and 45 respectively. A jet of control fluid may be applied to chamber 41 by either of passageways 44 or 45. In the most common arrangement, when a control jet enters chamber 41 from passageway 44 simultaneously with the main fluid stream from passageway 40, the resulting mixture exits from chamber 41 through passageway 43. Chamber 41 and its adjoining passageways may be designed so that under the foregoing condition, virtually no air will exit through passageway 42. Conversely, if a control jet is introduced into chamber 41 from passageway 45 and, if chamber 41 and the adjoining passageways have been so designed, no fluid will exit through passageway 43.

The fluid amplifier may be designed so that, instead of applying positive control jet by means of either passageways 44 or 45, it is possible to control the flow of fluid by letting the main flow fluid entering chamber 41 through passageway 40 aspirate the control fluid through either passageway 44 or 45. With this arrangement, if control inlet 38 is colsed and control inlet 39 opened, fluid entering through inlet chamber 34 and passing through passageway 40 into chamber 41, will aspirate air through passageway 45 and the resulting mixture will exit through passageway 42. Similarly, if control inlet 39 is closed and control inlet 38 is opened, the resulting mixture will exit from chamber 41 through passageway 43. The time elapsed for switching from one outlet branch to the other, for gaseous fluids such as air, is as short as ½ to 1 millisecond. The operational details of the fluid amplifier in conjunction with the fluid supply means will be further explained following a brief description of the motor circuit.

Referring now to FIGURE 3, the energizing circuit for motor 3 is provided through a pair of leads L–1 and L–2 which are intended to be connected across a suitable source of power (not shown), which will generally be the conventional 110 volt single phase source provided for domestic use. The circuit for the start winding S commences with lead L–2 and extends through conductors 46 and 47 to the terminal 29 disposed within fluid amplifier 17. A conductor 48 connects terminal 28 with the start winding S of the motor. Normally, contact plate 30 is biased by spring 32 into bridging contact with therminals 28 and 29, to provide a continuous circuit for the start winding. A conductor 49 extends from the opposite end of the start winding where it subsequently joins conductor 50. The circuit for the run winding R includes a branch conductor 51 which extends from conductor 46 to one end of the run winding. From the opposite end of the run winding, conductor 52 joins conductor 50, along with conductor 49 from the start winding. Disposed in conductor 50 is a conventional overload device 53. A switch 54 is provided along conductor 50 to complete the circuitry between the winding S and the power surce L–1.

The operation of the fluid responsive structure in conjunction with the energization circuit of the motor is as follows. When switch 54 is closed to draw power from lead L–1, the completed circuit will include lead L–1, switch 54, conductor 50, branch conductor 52, run winding R, return conductor 51, conductor 46 and lead L–2. Also energized at this time is the second branch conductor 49, the completed start winding S, conductor 48, the completed circuit through the fluid amplifier by way of terminal 28, contact plate 30, terminal 29, conductor 46 and lead L–2.

As soon as the motor is started, air under pressure flows from the compressor casing 11 through outlet 13, tubing 14, and into the opening 20 of the cover plate of the amplifier. This air flow will then pass from opening 20, through passage 22 in the control plate 18, where it eventually enters the inlet or power chamber 34 of the amplifier.

When the motor is started, opening 23 is in its normally closed condition because of the action of spring 26 on ball valve 25. This prevents the passage of air into control port 38. Since control port 39 is open to atmosphere, and control port 38 is effectively closed, the pressure differential between the two control ports is such that atmospheric air flows into control port 39 and through passageway 45 towards chamber 41. As the power or main stream of air flows from the inlet chamber 34 through passageway 40 and into chamber 41, the control pressure from passageway 45 deflects the main flow to the right as illustrated in FIGURE 3, and out branch passageway 42 where it exits from the amplifier by way of outlet port 35.

As the motor approaches operational speed, air exiting from the compressor casing increases proportionally in pressure. The ball valve 25 and compression spring 26 are designed so that at a suitable speed below the maximum speed the pressure applied against ball valve 25 is sufficient to move it downwardly, with the result that air under pressure will also flow through chamber 24, passage 27 and thence into the control port 38 of the amplifier.

At this time, the pressure differential between passages 44 and 45 is reversed, i.e. the pressure from passageway 44 is greater than that from passageway 45. Accordingly, the main stream of air passing through chamber 41 will be deflected toward the second branch passageway 43. While the time required to build up sufficient pressure to displace the ball valve 25 is on the order of .5 to 2.0 seconds depending on the load, the time to switch from one outlet branch to the other is about one millisecond. The main stream of air will leave passageway 43 by way of outlet port 36, which directs the flow of air against contact plate 29. The air flow pressure through outlet port 36 is sufficient to overcome the force of the biasing spring 31 that holds plate 30 in contact relationship with terminals 28 and 29. Accordingly, as soon as air is directed into outlet passageway 36, contact plate 30 is immediately raised from its bridging position and thereby de-energizes the start winding. The completed circuit will then include power lead L–1, switch 54, conductor 50, conductor 52, the run winding R, conductor 51, and return conductor 46 which joins the second lead L–2.

If the speed of the motor drops below the desired operational speed, the pressure applied against ball valve 25 will decrease, and the force of compression spring 26 will force the ball valve into its closed position. At this time, the conditions described above with reference to the initial starting procedure of the motor prevail. The pressure from control port 39 is greater than that from control port 38, thus causing the main stream to fluid to instantaneously deflect from branch passageway 43 to branch passageway 42. As soon as the pressure is removed from the bottom of contact plate 39, spring 31 will force contact plate 30 into bridging contact with terminals 28 and 29 and thereby conplete the circuit for the start winding. The start winding will remain energized until the motor reaches the specific rotational speed at which the air flow from the fan casing causes the ball valve to deflect downwardly, at which time the air flow through the amplifier will be deflected in the manner heretofore described.

It will be seen from the foregoing that my invention provides a novel fluid responsive device for controlling the energization of a motor winding. The operation of my motor control means is such that the start winding of a single phase induction motor is brought into or out of the circuit automatically, in response to a precise rotational speed of the motor.

While in accordance with the patent statutes I have described what is at present throught to be a preferred embodiment of my invention, it will be obvious to those skilled in the art that various changes and modifications may be made therein, and it is intended to cover in the appended claims all such modifications as fall within the true spirit and scope of my invention.

I claim:
1. For use with a single phase induction motor having a main winding, a start winding, and a motor shaft, improved control means comprising:
   (a) pressure actuated contact means actuable at a preselected pressure to de-energize the start winding;
   (b) fluid compression means adapted to be operatively associated with the motor to provide a stream of fluid at pressures proportional to the speed of the motor;
   (c) a first outlet passage disposed downstream of said fluid compression means and adapted to normally exhaust said fluid stream substantially exclusively to atmosphere;
   (d) a second outlet passage disposed downstream of said fluid compression means and adapted to direct said fluid stream against said pressure actuated contact means;
   (e) a control port disposed upstream of said first and second outlet passages and effective upon passage of fluid therethrough to essentially instantaneously deflect said fluid stream substantially exclusively into said second outlet passage; and
   (f) means responsive to a predetermined pressure of said fluid stream at least as great as said preselected pressure to admit fluid through said control port and thereby essentially instantaneously cause said fluid stream to flow into said second outlet passage and actuate said pressure operated contact means to de-energize the start winding when the motor exceeds a predetermined operational speed.

2. The invention of claim 1, further including a second control port disposed upstream of said first and second outlet passages, said second control port being in communication with atmosphere, whereupon the pressure differential between atmospheric pressure entering said second control port and the absence of fluid entering from said first-mentioned control port is sufficient to cause said fluid stream to be directed substantially exclusively into said first outlet passage.

3. For use with a single phase induction motor having a main winding, a start winding, and a motor shaft, improved control means comprising:
   (a) pressure actuated contact means actuable at a preselected pressure to de-energize the start winding;
   (b) fluid compression means adapted to be operatively associated with the motor shaft to provide a stream of fluid at pressures proportional to the speed of the motor;
   (c) a fluid amplifier having a main inlet, a control port, and first and second outlet passages;
   (d) said first outlet passage being adapted to normally exhaust said fluid stream substantially exclusively to atmosphere;
   (e) said second outlet passage communicating with said pressure actuated contact means and adapted to direct said fluid stream against said pressure actuated contact means;

(f) pressure actuated valve means disposed in said control port to normally prevent fluid flow therethrough, said pressure actuated valve means being actuable in response to a predetermined pressure of said fluid stream at least as great as said preselected pressure to admit fluid through said control port;

(g) said main inlet, said control port, said first outlet passage and said second outlet passage being arranged so that said fluid stream entering said main inlet will exit through said first outlet passage so long as the flow of fluid through said control port is prevented;

(h) said main inlet, said control port, said first outlet passage and said second outlet passage being further arranged so that, when said pressure actuated valve means admits fluid through said control port, the flow of said fluid stream will be essentially instantaneously deflected into said second outlet passageway and actuate said pressure operated contact means to de-energize the start winding when the motor exceeds a predetermined operational speed.

4. The invention of claim 3, further including means interconnecting said main inlet and said control port with said fluid stream in such a manner that said fluid admitted through said control port to effect the deflection of said fluid stream into said second outlet passage comprises a portion of said fluid stream.

References Cited

UNITED STATES PATENTS

| | | | |
|---|---|---|---|
| 1,834,217 | 12/1931 | Lipman | 318—221 |
| 1,946,165 | 2/1934 | Irwin | 318—221 |

ORIS L. RADER, *Primary Examiner.*

GENE RUBINSON, *Assistant Examiner.*

U.S. Cl. X.R.

137—82